United States Patent [19]
Tagashira et al.

[11] Patent Number: 5,679,186
[45] Date of Patent: Oct. 21, 1997

[54] PNEUMATIC TIRE WITH SIPES

[75] Inventors: Kenji Tagashira, Kobe; Akio Yamamoto, Akashi, both of Japan

[73] Assignee: Sumitomo Rubber Industries, Ltd., Hyogo-ken, Japan

[21] Appl. No.: 568,620

[22] Filed: Dec. 7, 1995

[51] Int. Cl.$^6$ ..................................................... B60C 11/12
[52] U.S. Cl. ........................... 152/209 R; 152/DIG. 3
[58] Field of Search ..................... 152/209 R, 209 D, 152/DIG. 3

[56] References Cited

U.S. PATENT DOCUMENTS

| | | | |
|---|---|---|---|
| 2,109,691 | 3/1938 | D'Ayguesvives | 152/209 R |
| 4,298,046 | 11/1981 | Herbelleau et al. | 152/209 D |
| 4,836,257 | 6/1989 | Mamada et al. | 152/DIG. 3 |
| 5,022,448 | 6/1991 | Ochiai | 152/209 R |
| 5,044,414 | 9/1991 | Ushikubo | 152/209 R |

FOREIGN PATENT DOCUMENTS

| | | | |
|---|---|---|---|
| 384182 | 8/1990 | European Pat. Off. | 152/209 R |
| 157406 | 7/1986 | Japan | 152/DIG. 3 |
| 117404 | 5/1990 | Japan | 152/209 R |
| 319030 | 12/1993 | Japan | 152/209 R |
| 727207 | 3/1955 | United Kingdom | 152/209 R |
| 2093777 | 9/1982 | United Kingdom | 152/209 R |

*Primary Examiner*—Steven D. Maki
*Attorney, Agent, or Firm*—Birch, Stewart, Kolasch & Birch, LLP.

[57] ABSTRACT

A pneumatic tire which is improved in uneven tread wear resistance without sacrificing the on-the-snow/ice running performance. The tread portion comprises a plurality of blocks, each provided with at least two sipes. Each sipe extends axially of the tire at an angle of from 90 to 88 degrees to the circumferential direction of the tire. In a cross section of the block parallel to the tire equatorial plane, each sipe extends radially inwardly from the radially outer surface of the block at an angle ($\beta$) of from 2 to 10 degrees with respect to the tire radial direction so that the radially inner ends of the sipes inclining the same direction towards the rear surface of the block. The rear surface of the block inclines to the same direction as the sipes at an angle ($\gamma 2$) of not more than 30 degrees with respect to the tire radial direction but not less than the angles ($\beta$) of the sipes. The front surface of the block inclines to the reverse direction to the rear surface.

4 Claims, 3 Drawing Sheets

Fig. 4
CONVENTIONAL
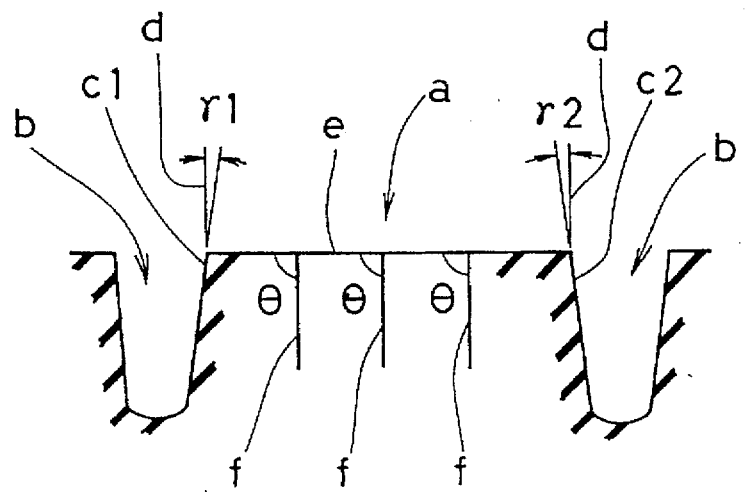
Fig. 5
CONVENTIONAL
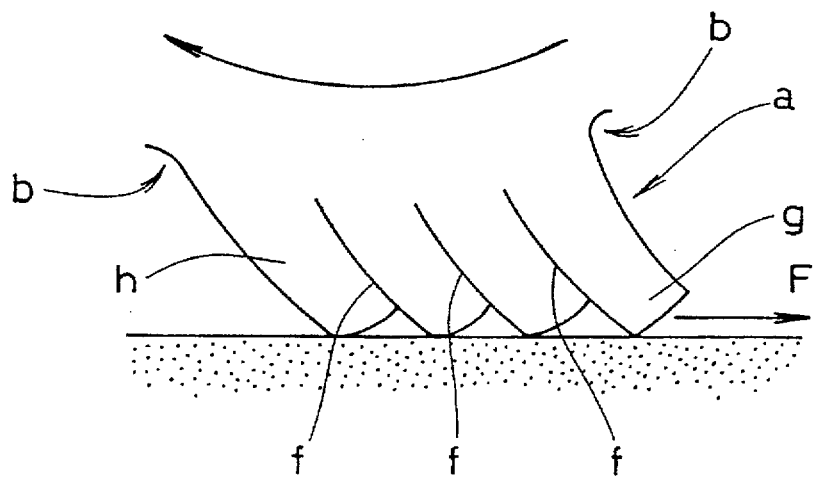

PNEUMATIC TIRE WITH SIPES

The present invention relates to a pneumatic tire which is improved in resistance to tread wear, especially to the heel-and-toe wear caused when the tire is driven, without sacrificing running performance on the snowy road.

BACKGROUND OF THE INVENTION

In general, a studless tire for used on the snowy/icy roads is provided with a plurality of blocks, and each block is provided with axially extending sipes or slits to increase the coefficient of friction between the tread surface and the road surface, and thereby to improve the on-the-snow/ice performance.

As shown in FIG. 4 which shows a sectional view taken in parallel to the tire equator, of a conventional block (a), the angle θ of the sipes (f) is 90 degrees to the top surface (e) of the block, and the sectional shape of the block is a trapezoid of which sides (c1) and (c2) facing axial grooves (b) are the same angle ($\gamma 1 = \gamma 2$) with respect to the tire radial line (d).

On the other hand, when a tire is driven and/or the tire rotation speed is higher than the vehicle running speed, the block is subjected to a shearing force (F) in the opposite direction to the tire rotation direction, as shown in FIG. 5. As a result, the toe (g) or front edge of the block in the running direction is liable to lose contact with the road surface, and the ground pressure of the block (a) is higher in the heel (h) or rear edge in the running direction than the toe (g). Thus, the ground pressure distribution is liable to be uneven, and so called heel and toe wear in which one edge (in this case, heel) wears more quickly than the other (thus, toe), is also liable to occur. As a result, the block loses its edge effect quickly, and the running performance especially on the icy roads is greatly deteriorated.

SUMMARY OF THE INVENTION

It is therefore, an object of the present invention to provide a pneumatic tire with blocks of which resistance to the heel-and-toe wear which is caused when the tire is driven is heightened to improve the running performance on the snowy/icy roads, a result suitable for a driving wheel.

According to one aspect of the present invention, a pneumatic tire comprises a tread portion comprising a plurality of blocks, each of the blocks having a radially outer surface, a front surface and a rear surface, the front surface and the radially outer surface defining a toe edge therebetween, the rear surface and the radially outer surface defining a heel edge therebetween, the toe edge and heel edge extending axially of the tire, each of the blocks provided with at least two sipes each extending axially of the tire, in a cross section of the block parallel to the tire equatorial plane, each of the at least two sipes extending radially inwardly from the radially outer surface of the block at an angle β of from 2 to 10 degrees with respect to the tire radial direction so that the radially inner ends of the sipes incline in the same direction towards the rear surface of the block, and the rear surface inclining to the same direction as the sipes at an angle $\gamma 2$ of not more than 30 degrees with respect to the tire radial direction but not less than the angles β of the sipes, and further the front surface inclining to the reverse direction to the rear surface.

Preferably, the inclination angle $\gamma 1$ of the front surface satisfies a condition $\gamma 2 < \gamma 1 \leq 30$ degrees.

Given that the angles of the number (n) of sipes in each block are $\beta 1, \beta 2 \text{---} \beta n$, in the order from the rear surface to the front surface, $\beta 1 > \beta 2 \text{---} > \beta n$ is preferable.

BRIEF DESCRIPTION OF THE DRAWINGS

An embodiment of the present invention will now be described in detail in conjunction with the accompanying drawings.

FIG. 4 is a sectional view of the conventional block.

FIG. 5 is a side view of FIG. 4 when the tire is driven.

DETAILED DESCRIPTION OF THE INVENTION

Figure 1:
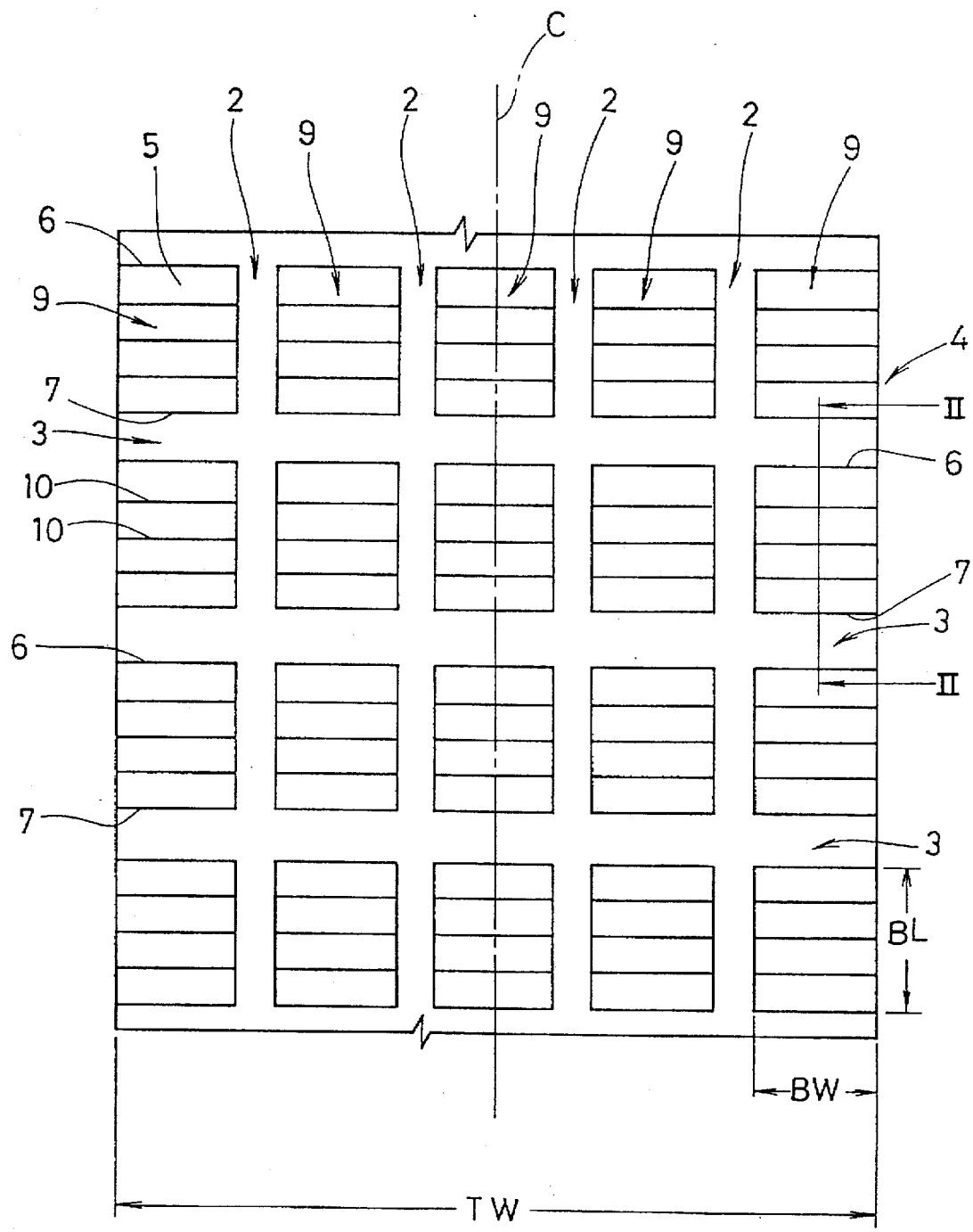
FIG. 1 is a developed plan view of an embodiment of the present invention showing an example of the tread pattern.

In FIG. 1, the pneumatic tire of the present invention comprises a tread portion 4 which comprises a plurality of, for example three to five, in this embodiment four circumferential grooves 2 extending continuously in the tire circumferential direction, and a plurality of axial grooves 3 extending axially of the tire, to divide the tread portion 4 into blocks 9 defining a block type tread pattern.

For the tire inside structure, any known and unknown structure, for example which comprises a radial ply carcass and a tread reinforcing belt, can be employed.

Each block 9 has a radially outer surface 5 defining a part of the tread surface, a pair of side surfaces, and a pair of front and rear surfaces 7 and 6 each facing one of the axial grooves 3. The front surface 7 and rear surface 6 define a front edge and a rear edge, respectively as the intersections with the radially outer surface 5. Here, the expression "front and rear" means that the tire is attached to a vehicle such that the front edge and rear edge are so disposed in the ground contacting patch of the tire. Accordingly, when the vehicle runs forward, the rear edge (heel) contacts with the ground prior to the front edge (toe).

Each block 9 has an axial width BW in the range of from 12 to 19% of the tread width TW, and a circumferential length BL in the range of from 16 to 25% of the tread width TW.

The axial grooves 3 extend generally straight at an angle of from 90 to 45 degrees, preferably 90 to 70 degrees, more preferably 90 to 88 degrees, in this embodiment 90 degree with respect to the circumferential direction of the tire. Thus, the front edge and the rear edge extend generally straight at the same angle as the axial grooves and substantially parallel with each other. The blocks 9 in this embodiment are thus substantially a rectangle at the radially outer surface 5.

Each block 9 is provided in the radially outer surface 5 with at least two sipes 10. Each sipe 10 is a very narrow groove or cut having substantially no width, and the width is not more than 1 mm, in this embodiment about 0.5 mm.

The sipes 10 in each block 9 extend generally straight at an angle of from 90 to 45 degrees, preferably 90 to 70 degrees, more preferably 90 to 88 degrees with respect to the circumferential direction of the tire. In this embodiment, three straight sipes 10 extending across the whole width of the block at 90 degrees are disposed. Thus, the sipes 10 subdivide the block outer surface 5 into substantially equi-wide portions. Besides a straight sipe, it is also possible to use a zigzag sipe, for example, such that only a middle portion is zigzag and the other lateral portion is straight.

It is preferable that the depth of the sipes 10 is set in the range of from 50 to 70% of the depth of the axial grooves 3 in view of compatibility of the required block rigidity with the running performance on the snowy/icy roads.

Therefore, the sipes 10 display the so-called edge effect, that is, the edges can scratch a slippery road surface, and the apparent coefficient of friction between the road surface and tire can be increased to improve running performance on the snowy/icy roads.

Figure 2:
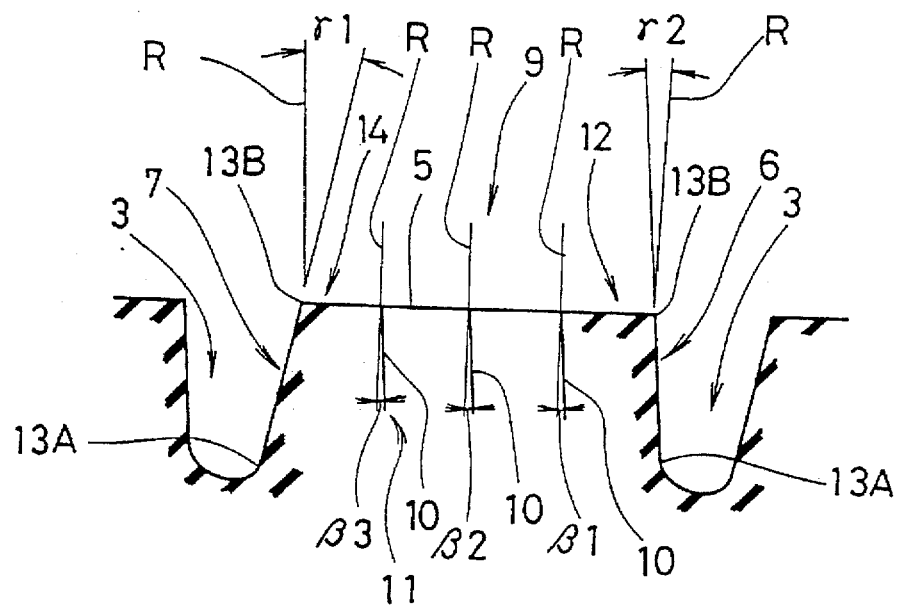
FIG. 2 is a sectional view taken along the line II—II in FIG. 1.
Figure 3:
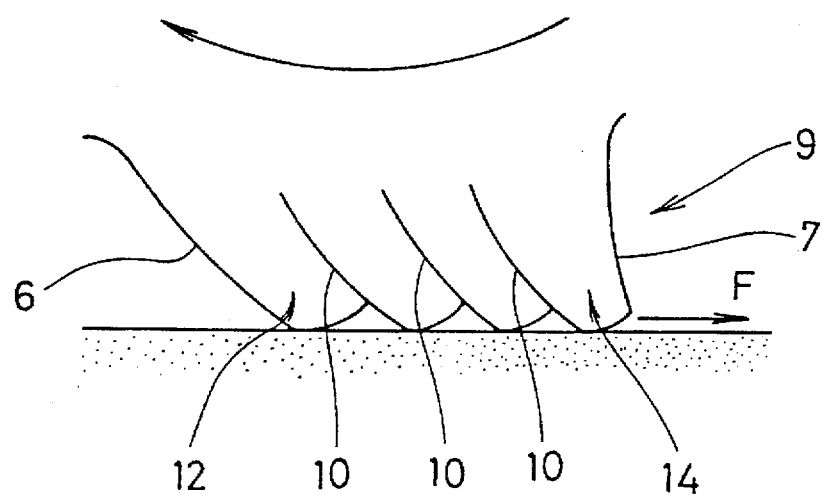
FIG. 3 is a side view of a block showing its deformation when the tire is driven.

As shown in FIG. 2, in the cross section being parallel to the tire equatorial plane C, each sipe, from its radially outer end at the block surface 5 to radially inner end 11, inclines at an angle ($\beta 1$, $\beta 2$, $\beta 3$) in the range of from 2 to 10 degrees, preferably 2 to 4 degrees with respect to a line R drawn in the tire radial direction, such that the radially inner end 11 inclines to the rear surface 6.

Further, the rear surface 6 is inclined to the same direction as that of the sipes such that the radially outer edge 13B is located on the front side of the radially inner edge 13A.

However, the front surface 7 is inclined to the reverse direction to that of the sipes such that the radially outer edge 13B is located on the rear side of the radially inner edge 13A.

Therefore, the thickness of a toe-side part 14 defined between the front surface 7 and the sipe 10 next to the front surface 7 is gradually increased from the top surface 5 to the base of the block 9, and the rigidity is increased to decrease the loss of contact of the block surface in the toe-side part 14 with the road surface during driving. Thus, the ground pressure distribution of the block surface 5 during driving is more evened to decrease the heel and toe wear.

Given that the number of the sipes in each block is (n) and the angles of the sipes are $\beta 1$, $\beta 2$—$\beta n$, in the order from the rear surface 6 to the front surface 7, the angles satisfy the following conditions, $\beta 1 \geq \neq \beta 2 \geq \neq — \geq \neq \beta n$, and $\beta 1 > \beta n$.

The number (n) of the sipes in each block is in the range of from two to six, usually three or four. By setting the angles in this way, the rigidity of the block 9 is gradually changed from the rear to front, and the heel and toe wear can be decreased. Preferably, the angles of the sipes 10 increases gradually from the front surface 7 to the rear surface 6. That is, $\beta 1 > \beta 2 > — > \beta n$.

In this case, the block rigidity is increased gradually from the rear to the front. As a result, the ground pressure distribution can be further improved to decrease the heel and toe wear.

Further, as shown in FIG. 2, the angle $\gamma 2$ of the rear surface 6 with respect to a line R drawn radially from its radially outer edge 13B is not less than the angle $\beta 1$ and not more than 30 degrees. That is, $\beta 1 \neq \leq \gamma 2 \neq \leq 30$ degrees.

Further, in this embodiment, the angle $\gamma 1$ of the front surface 7 with respect to a line R drawn radially from its radially outer edge 13B is more than the angle $\gamma 2$ and not more than 30 degrees. That is, $\gamma 2 < \gamma 1 \neq \leq 30$ degrees.

Accordingly, $\beta 1 \neq \leq \gamma 2 < \gamma 1 \neq \leq 30$ degrees.

If the inclination angles ($\beta 1$, $\beta 2$, $\ominus 3$) of the sipes are less than 2 degrees, the rigidity of the toe-side part can not be increased. Contrarily, if the angles are more than 10 degrees, cracks are liable to occur at the radially inner ends of the sipes.

If the angle $\gamma 2$ is more than 30 degrees, it is difficult to maintain the required number of the blocks, that is, the edge effect is decreased. As a result, on-the-snow running performance is deteriorated. If the angle $\gamma 2$ is less than the angle $\beta 1$, cracks are liable to occur at the base of the toe-side part 12.

By satisfying the relationship of $\gamma 2 < \gamma 1 \neq \leq 30$ degrees, the rigidity of the toe-side part 14 can be further increased, and its loss of contact with the ground is effectively prevented to further improve the resistance to the heel-and-toe wear.

The values used in the above-mentioned limitations are measured under a standard condition that the tire is mounted on a standard rim and inflated to a standard inner pressure, but loaded with no tire load.

[Working Example]

Test tires of size 5.60R13 having the block pattern shown in FIG. 1 and the same construction except for the sipes and angles were prepared and tested for the following performances. The test results are shown in Table 1.

1) On-the-ice braking performance

A test car provided with test tires was run on a road surface covered with ice at a speed of 40 km/h and lock braked. Then, the running distance to stop was measured. In Table 1, the running distance is indicated by an index based on that the reference tire 1 is 100. The larger the index, the better the braking performance.

2) On-the-snow braking performance

The test car provided with test tires was run on a road surface covered with snow at a speed of 40 km/h and lock braked. Then, the running distance to stop was measured. In Table 1, the running distance is indicated by an index based on that the reference tire 1 is 100. The larger the index, the better the braking performance.

3) Heel and toe wear resistance

The test tires were mounted on the front wheels of a 1800 cc front wheel drive car, and the test car was run for 4,000 km on asphalt paved highways. Then, the difference between the wear amount in the heel and that in the toe was measured. In Table 1, the difference is indicated by an index based on that the reference tire 1 is 100. The larger the index, the better the resistance to heel-and-toe wear.

It was confirmed through the tests that the tires according to the present invention were improved in the heel-and-toe wear resistance while maintaining the on-the-snow/ice braking performance. Further, it is also confirmed that such effects can be obtained regardless of the tire size.

As described above, in the pneumatic tires according to the present invention, uneven wear which deteriorates the road grip can be decreased without sacrificing the on-the-snow/ice running performance.

TABLE 1

|  | Ref. 1 | Ex. 1 | Ex. 2 | Ex. 3 | Ex. 4 | Ref. 2 | Ex. 5 | Ex. 6 | Ex. 7 | Ex. 8 | Ex. 9 | Ex. 10 |
| --- | --- | --- | --- | --- | --- | --- | --- | --- | --- | --- | --- | --- |
| Angle (deg.) | | | | | | | | | | | | |
| $\beta_1$ | 0 | 2 | 3 | 4 | 10 | 3 | 3 | 3 | 3 | 3 | 4 | 4 |
| $\beta_2$ | 0 | 2 | 3 | 4 | 10 | 3 | 3 | 3 | 3 | 3 | 3 | 4 |
| $\beta_3$ | 0 | 2 | 3 | 4 | 10 | 3 | 3 | 3 | 3 | 3 | 2 | 2 |
| $\gamma_1$ | 20 | 20 | 20 | 20 | 20 | 20 | 20 | 30 | 15 | 10 | 20 | 20 |
| $\gamma_2$ | 10 | 10 | 10 | 10 | 10 | 0 | 3 | 20 | 15 | 20 | 10 | 10 |
| Test results | | | | | | | | | | | | |
| On-the-ice braking | 100 | 100 | 100 | 100 | 100 | 100 | 100 | 100 | 100 | 100 | 100 | 100 |
| On-the-snow braking | 100 | 100 | 100 | 100 | 100 | 101 | 101 | 98 | 100 | 100 | 100 | 100 |
| Heel & Toe wear | 100 | 103 | 105 | 107 | 107 | 95 | 102 | 108 | 103 | 102 | 108 | 106 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A pneumatic tire comprising a tread portion, said tread portion comprising a plurality of blocks defined by axial grooves, each of the blocks having a radially outer surface, a front surface and a rear surface, the front surface and the radially outer surface defining a toe edge therebetween, the rear surface and the radially outer surface defining a heel edge therebetween, the toe edge and heel edge extending axially of the tire, each of the blocks provided with at least two sipes each extending axially of the tire, each of said at least two sipes being narrower in width than each of the axial grooves, in a cross section of the block parallel to the tire equatorial plane, each of the at least two sipes extending radially inwardly from the radially outer surface of the block at an angle $\beta$ of from 2 to 10 degrees with respect to the tire radial direction such that radially inner ends of the sipes incline in the same direction towards the rear surface of the block, and the rear surface inclining in the same direction as the sipes at an angle $\gamma_2$ of not more than 30 degrees with respect to the tire radial direction but not less than the angles $\beta$ of the sipes, and further the front surface inclining in the opposite direction of the direction of inclination of the rear surface, wherein the inclination angle $\gamma_1$ of the front surface and the inclination angle $\gamma_2$ of the rear surface satisfy the following condition:

$\gamma_2 < \gamma_1 \leq 30$ degrees, the number of the sipes in each block is (n) and the angles of the sipes are $\beta_1, \beta_2 \ldots \beta_n,$ in the order from the rear surface to the front surface, and the angles satisfy the following relationship, $\beta_1 > \beta_2 > \ldots > \beta_n$ wherein all of the sipes in each block extend in the same direction with respect to the tire radial direction.

2. The pneumatic tire according to claim 1, wherein the depth of the sipes is in the range of from 50 to 70% of the depth of the axial grooves.

3. The pneumatic tire according to claim 1, wherein each of the blocks has an axial width in the range of from 12 to 19% of the width of the tread and a circumferential length in the range of from 16 to 25% of the width of the tread.

4. The pneumatic tire according to claim 1, wherein the sipes in each of the blocks are arranged such that the block outer surface is subdivided into substantially equiwide portions.

* * * * *

UNITED STATES PATENT AND TRADEMARK OFFICE
CERTIFICATE OF CORRECTION

PATENT NO.   : 5,679,186
DATED        : October 21, 1997
INVENTOR(S)  : TAGASHIRA et al.

It is certified that error appears in the above-indentified patent and that said Letters Patent is hereby corrected as shown below:

Please insert Item [30]  Foreign Application Priority Data
                        Dec. 16, 1994 [JP]  Japan        6-334264

Signed and Sealed this

Twenty-fourth Day of March, 1998

*Attest:*

BRUCE LEHMAN

*Attesting Officer*    *Commissioner of Patents and Trademarks*